United States Patent [19]
McArthur et al.

[11] 3,952,263

[45] Apr. 20, 1976

[54] FISSION FRAGMENT EXCITED LASER SYSTEM

[75] Inventors: David A. McArthur; Philip B. Tollefsrud, both of Albuquerque, N. Mex.

[73] Assignee: The United States of America as represented by the United States Energy Research and Development Administration, Washington, D.C.

[22] Filed: Oct. 4, 1974

[21] Appl. No.: 512,810

[52] U.S. Cl. ..................... 331/94.5 P; 331/94.5 G; 330/4.3
[51] Int. Cl.² ......................... H01S 3/09; H01S 3/22
[58] Field of Search ..................... 331/94.5; 330/4.3

[56] References Cited
UNITED STATES PATENTS 3,391,281   7/1968   Eerkens ..................... 331/94.5 X

OTHER PUBLICATIONS

Brugger, PPF Type Reactor . . . Experiments, (An-cr-1093, contract at (10-1)-1375 report, 31 pp., Nov. 1972.

*Primary Examiner*—Robert J. Webster
*Attorney, Agent, or Firm*—Dean E. Carlson; Dudley W. King; Richard E. Constant

[57] ABSTRACT

A laser system and method for exciting lasing action in a molecular gas lasing medium which includes cooling the lasing medium to a temperature below about 150 K and injecting fission fragments through the lasing medium so as to preferentially excite low lying vibrational levels of the medium and to cause population inversions therein. The cooled gas lasing medium should have a mass areal density of about $5 \times 10^{-3}$ grams/square centimeter, relaxation times of greater than 50 microseconds, and a broad range of excitable vibrational levels which are excitable by molecular collisions.

12 Claims, 3 Drawing Figures

3,952,263

FISSION FRAGMENT EXCITED LASER SYSTEM

BACKGROUND OF INVENTION

There are many potential laser applications which are presently being limited from development or use because of the unavailability of sufficiently high power laser systems or because the energy required to excite the lasers is of such high levels. Some of these applications include the use of laser beams for producing fusion, for laser communication systems, for energy extraction from neutron sources, for certain weapon-type uses, or the like.

Proposals have been made to utilize the potentially high energy available in fission reactors to excite a lasing medium to cause population inversions which may produce laser energy. These proposals were based on the total energy which is inherently available in a fission reactor and the potentially small relative size a reactor may have and still be capable of producing this energy. Attempts to achieve laser excitation from fission reactors, however, have not been successful as no reliable measurable laser gain or laser action has been previously reported.

SUMMARY OF INVENTION

In view of the above, it is an object of this invention to provide laser action using a high intensity source of neutrons.

It is a further object of this invention to provide laser action wherein the pumping energy for the laser medium originates solely from fissioning produced in a nuclear fission or fusion system.

It is a still further oject of this invention to provide such lasing action by collisions between fission fragments, produced from a high intensity neutron source, and a molecular gas lasing medium.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art.

This invention relates to method and apparatus for exciting lasing action by injecting fission fragments through a molecular gas lasing medium at sufficient pressure and low temperature to excite vibrational levels from which lasing may occur and to induce population inversions therebetween.

DESCRIPTION OF DRAWING

The invention is illustrated in the accompanying drawing wherein.

DETAILED DESCRIPTION

It has been found that lasing action may be achieved in a carbon monoxide (CO) gas when the gas is cooled to a low temperature and then excited by fission fragments and alpha particles emerging from neutron irradiated fissionable material. The fission fragments and alpha particles preferentially excite vibrational levels of the CO gas under these conditions and induce population inversions between the levels from which laser energy may be extracted. The CO gas is disposed in a laser cavity provided with appropriate reflectors to achieve a highly effective extraction of the laser energy.

Figure 1:
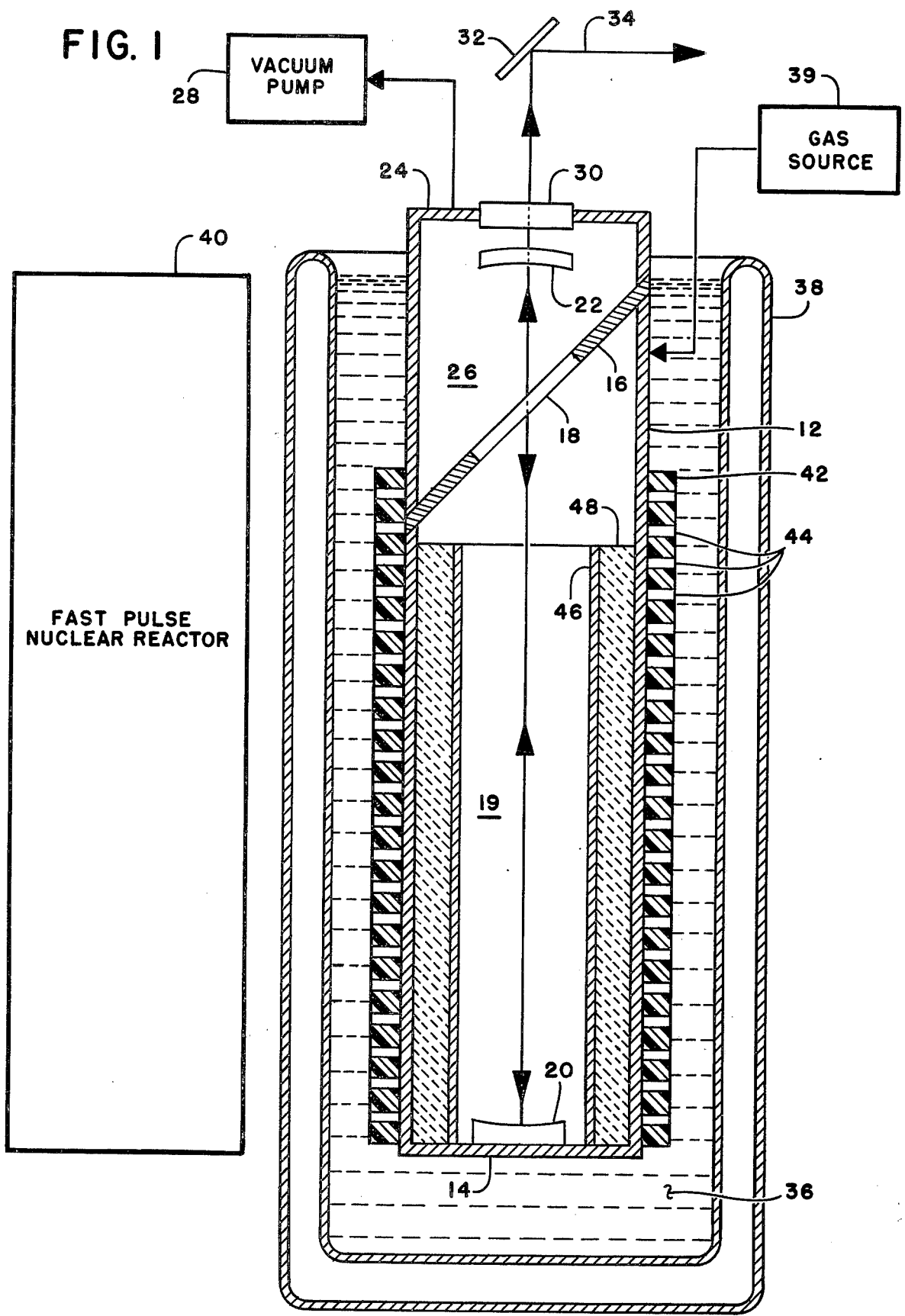
FIG. 1 is a cross-sectional and somewhat diagrammatic view of a laser apparatus which is capable of operating in the manner prescribed by the present invention.

FIG. 1 illustrates apparatus which may be utilized to produce this lasing action. The apparatus may include a laser gas chamber enclosed within a tubular housing 12 closed at one end by wall 14 and at the other end by a suitable wall 16 and Brewster window 18. A laser cavity 19 may be formed between a totally reflecting mirror 20 (generally greater than about 99% reflective) positioned adjacent end wall 14 with an adjustable, partially reflecting mirror 22 (such as from about 96 to 98.5% reflective) positioned at the other end of the lasing cavity 19 either within housing 12 or at a location exterior to housing 12 so as to more conveniently effect alignment thereof with mirror 20 with appropriate supporting and control mechanisms (not shown). In order to maintain the molecular gas lasing medium within housing 12 at the desired low temperatures uniformly throughout the housing, an additional container or housing 24 may be provided adjacent to end 16 of housing 12 and its interior 26 evacuated to low pressure to achieve a thermal insulating condition by an appropriate vacuum pump 28, generally to pressures of about 1 pascal. An appropriate window 30 which is transparent to the laser wavelengths may be positioned in a wall of container 24 aligned axially with mirrors 20 and 22 of the lasing cavity 19. Optical means may be provided external to the laser cavity 19, such as a mirror 32, to direct the laser beam 34 emitted from laser cavity 19 to a desired location or use.

In the embodiment shown, the housing 12 and container 24 for laser cavity 19 is of generally tubular configuration with the mirrors, windows and other optics aligned generally along the axis thereof. The respective windows, mirrors and other optics may be selected to be compatible with the wavelength of the laser beam produced, in a manner well known in the art. In addition, the laser beam 34 may be extracted from only one end of the laser cavity 19 to aid in the maintenance of uniform temperatures throughout the lasing medium within housing 12. It is understood that other laser cavity configurations, such as may be obtained by multiple laser paths defined between off-set mirrors in a rectangular or other shaped container, may be utilized within the scope of this invention so long as temperature gradients are minimized within the lasing medium to minimize unwanted laser beam deflections which may be caused thereby. In addition, multiple beam access to the lasing cavity may be utilized, if desired, so long as temperature gradient effects can be minimized.

The laser housing 12 and at least a portion of the container 24 may be immersed in a liquified gas 36 at a desired temperature level, such as liquid nitrogen at a temperature of about 77 K, within an appropriate insulated container, bottle or Dewar flask 38. The liquified gas should be maintained at a level in which the entire housing 12 is immersed so as to maintain all the walls of housing 12 at the temperature of the liquified gas. The Dewar flask 38 may assume whatever shape is necessary to enclose laser housing 12 and container 24 with the liquified gas 36 in the desired manner to maintain the housing 12 at this temperature level. It has been found that for most effective operation of the laser and for production of highly selective vibrational excitation of the molecular gas in housing 12, the temperature of liquified gas 36 should be in the range of from about 60 to about 150 K with the preferred level generally being below about 77 K. Lower temperatures of the lasing medium may be utilized in non-static operations where condensation of the lasing medium can be prevented.

The housing 12 walls should be made of a highly thermal conductive material, such as stainless steel, brass and aluminum, which are usable in the environment to which the laser will be subjected. The interior of housing 12 may be flushed and evacuated of unwanted gases and other materials and back filled to a suitable gas pressure by a suitable gas source 39 to fill the housing 12 with CO gas. It is understood that the CO lasing medium may be used in a relatively pure form or mixed with suitable auxiliary gases like helium, argon, nitrogen, etc. The gas should be filled within housing 12 to a pressure of from about $10^3$ to about $10^5$ pascals( 1 pascal is equal to about 0.00750062 Torr), depending upon the size of housing 12 and the desired range of fission fragments therein. For example, alpha particles and fission fragments may travel about 3 centimeters in CO gas at a pressure of about $1.3 \times 10^4$ pascals (97.5 Torr) and 77 K, before losing most of their kinetic energy.

A fast pulse or fast burst nuclear reactor 40 or other source of high intensity neutrons may be positioned adjacent to the exterior of Dewar flask 38 so as to direct the neutrons from the reactor 40 through the laser cavity 19 and CO gas enclosed therein. The reactor or other neutron source 40 should be capable of producing a neutron flux of greater than $10^{17}$ neutrons/square centimeter/second in a pulse of the order of a few milliseconds in length or less. The energy released in the production of such a neutron pulse may be from about 6 to about 100 or more megajoules in amplitude in typical pulse widths of from about 50 microseconds to about 5 milliseconds. Fast pulse nuclear reactors which are capable of generating neutron pulses having these characteristics may typically be made from bare metal, unreflected and unmoderated critical assemblies, for example in a right circular cylinder of about 20 centimeters in diameter and 20 centimeters high of fully enriched uranium alloy (about 105 kilograms) containing about 10 weight percent molybdenum. The critical assembly may be divided at its horizontal mid-plane, the upper half being stationary and the lower half being capable of moving over a range which is sufficient to make the assembly be uncritical. The critical assembly may be covered by a suitable decoupling shroud. Such a reactor may produce a peak neutron rate of about $2 \times 10^{19}$ neutrons/square centimeter/second at a peak gamma rate of about $4.8 \times 10^9$ rads ($H_2O$)/second and peak power of about $2.3 \times 10^{11}$ watts. The reactor 40 should be positioned near or adjacent laser cavity 19, such as in the position shown or in other positions encompassing or partially encompassing the laser cavity 19, so that neutron radiation therefrom is directed essentially uniformly through the housing 12. A typical reactor which may be utilized in this laser is described in report SLA-73-0551 entitled "Sandia Pulsed Reactor II (SPR-II): Experimenters Manual" by L. L. Bonzon and J. A. Snyder, dated November 1973.

In order to thermalize the neutrons produced by reactor 40 to a usable neutron energy level, a tubular neutron moderator structure 42 may be disposed either within or about the exterior of housing 12 between the fast neutron source 40 and fissionable material in housing 12. The moderator structure 42, when located outside housing 12, as shown, should be positioned in intimate contact with outer wall surfaces of housing 12 to minimize the amount of liquified gas 36 may be between the moderator structure 42 and housing 12 since the liquified gas may absorb thermal neutrons. In addition, the moderator structure 42 may be provided with perforations or holes 44 passing between the liquified gas 36 and the outer surface of housing 12 so as to bring the liquified gas 36 into contact with a substantial portion of housing 12 to insure maintenance of a uniform temperature throughout the interior of housing 12. Perforations 44 may typically be about 0.5 centimeter in diameter in either a regular or random pattern spaced to provide the desired cooling without adversely affecting neutron moderation. The fast neutrons moderated by moderator structure 42 to thermal neutrons may then traverse the housing 12 substantially unimpeded by the various wall materials.

A material which may act as source of fission fragments upon irradiation by thermal neutrons may be positioned within the interior of housing 12 so that fission fragments produced in the fissionable material are injected or introduced into and throughout the interior of housing 12 and through the CO gas lasing medium enclosed therein. For example, a coating or layer of fissionable material 46 having a generally tubular shape may be positioned within housing 12 concentric with the axis of the housing. Since the coating or layer may not be self-supporting, the layer 46 may be attached to or be otherwise supported by a tubular member 48 which is made of a material or materials substantially transparent to thermal neutrons, such as alumina, copper, and/or quartz. The fissionable material 46 may be deposited directly on the inner surface of member 48 or it may be a foil or sheet which is fitted into the cylinder 48. The source of fission fragments, that is fissionable material 46, may be a uranium containing compound, such as $UO_2$, $U_3O_8$, or the like, which is highly enriched in uranium 235. Other sources of fission fragments or fissionable materials may be utilized as long as they are compatible with the lasing medium and do not degrade the lasing action produced by the fission fragments.

As indicated in the embodiment shown, the Dewar flask 38 is open at one end for convenience in filling so that the Dewar flask must be positioned in a vertical position with housing 12 suitably supported and immersed vertically in the liquified gas 36 through the open end. Further, as mentioned above, the positioning of the Dewar flask and laser in this vertical position also reduces the number of windows required to pass a laser beam in and out of the laser cavity 19 and the cooled chamber of housing 12. Convection currents in the gas laser medium are made very small by insulating Brewster window 18 with a vacuum region 26, or otherwise, and by allowing the CO lasing medium to come into contact only with chamber walls which are either in direct contact with the liquified gas 36 bath, or with walls or materials which have no external heat input or which are connected by a relatively short path of high thermal conductivity material to the liquified gas 36 bath. One totally-reflecting internal laser mirror, which for convenience may not be adjustable, is used at one end of laser cavity 19 to reduce laser cavity losses which may be caused by use of more than one laser window. The adjustable, partially transmitting laser output mirror 22 (as well as window 30) may be at or near room temperature or ambient temperature, being insulated from the cold portion of laser cavity 19 by evacuated region 26, and is internal to this evacuated region to avoid an additional window inside the laser cavity 19.

In CO gas lasing medium, a broad range of vibration levels may typically be excited by molecular collisions, each of which may produce population inversions, and contribute to the laser beam 34 along with the other vibrational levels. The fast neutron excitation pulse from a fast-burst reactor allows the energy produced to be deposited before large density gradients can develop in the CO lasing medium as a result of heating by the fission fragments or exciting charged particles therein. The CO lasing medium is thus a very efficient molecular collision excitable medium, particularly at low temperatures and at densities sufficient to stop fission fragments in a reasonable distance.

Figure 2:
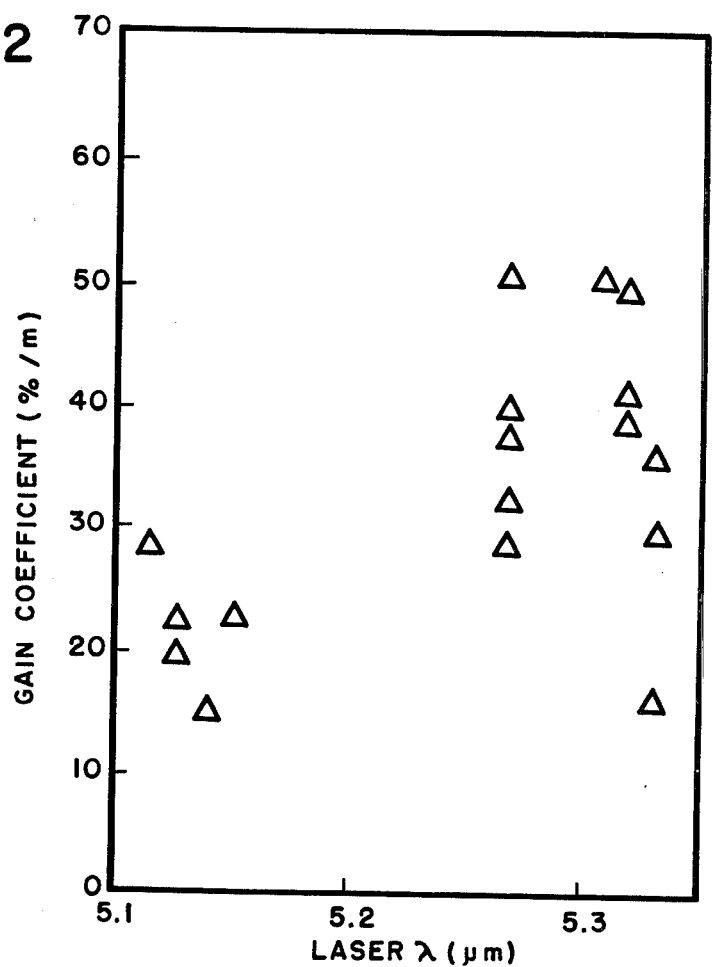
FIG. 2 is a graph of laser gain versus laser wavelength for a laser system of the type shown in FIG. 1.

A laser system or arrangement of the type illustrated in FIG. 1 was constructed with a stainless steel housing having an active lasing medium length of about 20 centimeters filled with a relatively pure CO laser gas at about $1.3 \times 10^4$ pascals (97.5 Torr) and 77 K immersed in liquid nitrogen. The optical elements defined a laser cavity of about 1 centimeter in diameter and 40 centimeters long. The fissionable material (uranium 235 enriched $U_3O_8$) was in a foil form having a thickness of about $10^{-3}$ centimeter, a 2.6 centimeter inside diameter and a length of 20 centimeters within a 0.32 centimeter thick alumina tube. The moderator structure was a 2.2 centimeter thick perforated polyethylene tubular structure located in contact with the outer walls of the housing about 20 centimeters from the center of a fast pulse nuclear reactor. When the reactor was made critical, it generated a fast neutron pulse of about $10^{17}$ neutrons/square centimeter/second in a pulse about 0.05 milliseconds in duration through the laser housing. The fission fragment source was irradiated with roughly uniform thermal neutron flux (less than about 0.4 electron volt neutrons at greater than about $10^{16}$ neutrons/square centimeter/second) which in turn produced fission fragments which were injected into the CO lasing medium at an average energy deposition of about 200 joules/liter. FIG. 2 illustrates the gain coefficient (percent gain/laser cavity length (meters) after correction for fluorescence) achieved as a function of laser wavelength. The gain pulse peaked at about 20 to 30 microseconds after the fast neutron pulse peak and exhibited a full width at half maximum of about 75 microseconds. A laser pulse about 1000 times larger than any background signal detected (including radiation noise and fluorescence from the laser medium) was produced by the above apparatus when mirror 22 was aligned parallel to mirror 20. This pulse disappeared when mirror 22 was deliberately misaligned. It appears that about 50% of the fission fragment energy deposited in the gas may cause vibrational excitation while only about 30% causes translational motion. These excitation efficiencies are significantly higher than from prior excitation sources.

As stated above, the CO molecular gas lasing medium requires collisions to develop desired laser inversions which are achieved over a broad range of vibrational levels, many of which are at relatively low vibrational states or levels. In addition, it has been found that the lasing medium should have a mass areal density (product of medium density and medium depth) of about $5 \times 10^{-3}$ grams/square centimeter to effect fission fragment stopping and relaxation times of from about 50 to 1000 microseconds to provide effective molecular collision excitation of the vibrational levels. Other gases such as nitrogen $N_2$, may exhibit similar molecular collision excited vibrational characteristics which may be utilized at high pressures to achieve excitation from fission fragments. In the case of nitrogen, the vibrational excitation may be transferred to a lasable molecular gas, such as carbon dioxide ($CO_2$), to effect lasing action.

Figure 3:
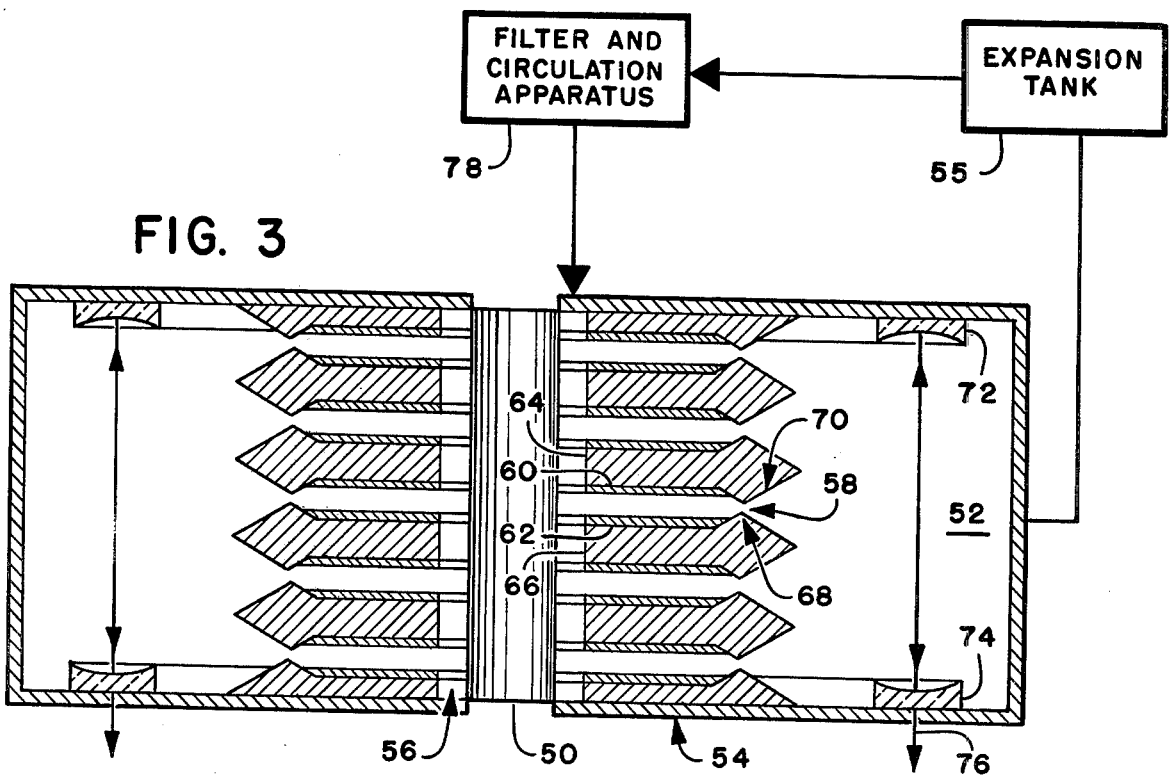
FIG. 3 is a diagrammatic, cross-sectional view of an alternate laser system for producing high energy laser beams using techniques from the present invention.

It may be desirable, either with the CO lasing medium or a mixture of nitrogen with $CO_2$ to utilize the lasing medium in a non-static or gas flow arrangement to achieve even lower lasing medium temperatures, or to cool a laser medium heated excessively by fission fragment excitation. Such an operation may be used so long as the lasing medium can be brought to the desired low temperatures with minimized conduction currents and gas density gradients. The lasing medium, either during, before or after it has been excited by fission fragments, may be cooled, for example, by flowing the gas through a small aperture or apertures into a duct with increasing cross-sectional area. Such an arrangement is shown in somewhat simplified form in FIG. 3 in which the fast-burst nuclear reactor or other fast neutron source 50 is annularly surrounded by a laser cavity 52 and a plurality of annularly expanding gas nozzles or nozzle array 54. Each of the nozzles in the nozzle array 54 are symmetrical and of annular shape or configuration. For example, each nozzle of the array is coupled to a central annular plenum 56 in which the gas to be excited by the reactor 50 is appropriately fed. The gas in plenum 56 flows therefrom through a plurality of annular, disc-shaped chambers, such as chamber 58, between facing disc-shaped fissionable material foils or foil pairs, such as foils 60 and 62. The foil pairs are in turn supported on facing surfaces of annular, neutron moderating graphite or the like structures, such as structures 64 and 66, which are shaped so as to provide a plurality of channels therebetween, such as channel 58 between foils 60 and 62. The channels are of generally uniform cross section and may terminate in an annular contracting nozzle portion and expansion portion, such as nozzle portion 68 and expansion portion 70. The excited gas flowing from the expansion portion, now traveling at a high rate of speed and cooled to a low temperature, mixes with the gases coming from the other expansion portions and nozzles in the laser cavity 52 between annulus of mirrors 72 and 74. The excited lasing medium may induce population inversions in the annular laser cavity 52, so as to produce an annular shaped laser beam 76. The resulting low pressure and high speed gas emerging from the lasing cavity 52 may flow to an appropriate expansion chamber or tank 55 disposed about lasing cavity 52. The used laser medium may be filtered to remove fission fragments and the like and the molecular gas lasing medium recirculated back to plenum 56 by suitable filter and circulation apparatus 78.

The molecular gas lasing medium, such as CO or a mixture of $N_2$ and $CO_2$ may typically be circulated or pumped into plenum 56 at a pressure of about $10^6$ pascals and then flowed through the annular chambers 58, nozzle portion 68 and expansion portion 70. The chambers 58 may typically have a length of about 55 centimeters and width of about 1.5 centimeters between foil structures 0.16 centimeters thick and moderating structures 1.2 centimeters thick. With an expansion ratio of about 10 to 1 between portions 68 and 70, the excited gas may be traveling at a speed of about mach 4 and at a temperature of from about 50 to 150 K. The reactor 50, in the meantime, may be emitting fast neutrons which are moderated by the moderator structures to thermal neutrons, which in turn inject fission fragments into chambers 58 to preferentially excite the vibrational levels of the gases flowing through annular chamber 58. As the gas cools after flowing through the nozzles, the vibrational excitations may be "trapped" due to the relaxation times of the gas being increased by this cooling. The "trapped" vibrational levels may then produce population inversions and lasing action in the lasing cavity 52.

It will be apparent that other dynamic gas laser, gas flow channel, and fissionable material arrangements or constructions may be utilized than that shown to effect the desired fission fragment excitation of a molecular gas lasing medium. For example, single nozzle arrangements with one or more fissionable material channels through which the gas lasing medium flows or one or more pulse reactors may be used. In addition, a $CO_2$ lasing medium may be injected into the excited $N_2$ gas at any appropriate time, such as when the excited gas flows through the expansion nozzle, rather than mixing the same initially, as described.

The power requirements to operate the lasers described above is limited to the power required to provide mechanical operation of the reactor neutron source and cooling of the molecular gas medium, since the laser energy utilized is stored in the fissionable nuclei. The overall size of the laser system may thus be relatively small compared to the overall energy which may be produced.

It can also been seen that the laser cavity described may be positioned adjacent a fusion or fission reactor to extract energy therefrom by using the reactor as the neutron source and that the energy so extracted, in laser light beam form, may then be tightly focused so as to be in a highly useful form for many industrial and other processes and applications.

What is claimed is:

1. A method for exciting lasing action in a laser chamber comprising injecting into said laser chamber a molecular gas lasing medium having a mass areal density of about $5 \times 10^{-3}$ grams/square centimeter, relaxation times of from about 50 to 1000 microseconds, and excitable vibrational levels from which population inversions may occur and which are excited by molecular collisions; cooling said lasing medium to a temperature of from about 60 K to about 150 K; injecting fission fragments through said laser chamber and said lasing medium to excite the vibrational levels of said lasing medium and induce population inversions therebetween; and stimulating and extracting a laser beam from said excited lasing medium in said laser chamber.

2. The method of claim 1 wherein said injected gas lasing medium is at a pressure of from about $10^3$ to $10^5$ pascals (7.5 to 750 torr).

3. The method of claim 1 wherein said gas lasing medium is selected from the group consisting of carbon monoxide and a mixture of nitrogen and carbon dioxide.

4. The method of claim 1 wherein said fission fragments are injected into said laser chamber by irradiating a fissionable material in said chamber with thermal neutrons at a dose rate of greater than about $10^{16}$ neutrons/square centimeter/second.

5. The method of claim 4 including producing fast neutrons at a dose rate of greater than about $10^{17}$ neutron/square centimeter/second external to said laser chamber and at least partially moderating the same before entering said chamber and irradiating said fissionable material.

6. The method of claim 5 including positioning said fissionable material between said lasing medium and said neutrons.

7. The method of claim 6 wherein said fissionable material is a layer including uranium 235.

8. A laser system comprising a chamber with high thermal conductivity walls housing a molecular gas lasing medium at a pressure of from about $10^3$ to $10^5$ pascals and having a mass areal density of about $5 \times 10^{-3}$ grams per square centimeter, relaxation times of from about 50 to 1000 microseconds, and excitable vibrational levels from which population inversions may occur and which are excited by molecular collisions; means for repetitively reflecting laser light through said chamber and for conveying a portion thereof from said chamber to provide a laser cavity including said chamber and lasing medium; a fissionable material disposed in said chamber; a neutron moderator disposed in contact with surfaces of said chamber walls; means for cooling said lasing medium to a temperature of from about 60 to about 150 K through said chamber walls and said neutron moderator; and means for irradiating said fissionable material through said moderator with neutrons at a dose rate of greater than about $10^{16}$ neutrons/square centimeter/second and for injecting fission fragments therefrom through said lasing medium to excite said lasing medium and effect lasing thereof.

9. The system of claim 8 wherein said housing is generally tubular in shape and said fissionable material includes uranium 235 disposed in a layer on the inner surface of a hollow alumina tube positioned along the inner surface of said housing.

10. The system of claim 8 wherein said neutron moderator is perforate and said cooling means includes liquid nitrogen disposed about said neutron moderator and throughout its perforations in contact therethrough with the outer surface of said chamber walls.

11. The system of claim 10 wherein said reflecting means includes a Brewster window disposed in axial alignment with said reflected laser light in a wall of said chamber and an evacuated cover member is disposed about outer portions of said window and adjoining chamber walls.

12. A laser system comprising a laser chamber; a fissionable material adjacent said chamber; means for disposing a molecular gas lasing medium in said chamber in close association with said fissionable material, said gas lasing medium including an excitable gas having a mass areal density of about $5 \times 10^{-3}$ grams/square centimeter, relaxation times of from about 50 to 1000 microseconds, and vibrational levels excitable by molecular collisions; a neutron moderator adjacent said fissionable material; means for irradiating said fissionable material through said moderator with neutrons at a dose rate of greater than about $10^{16}$ neutrons/square centimeter/second to direct fission fragments from said fissionable material through said gas lasing medium to excite said vibrational levels; means for cooling said gas lasing medium to a temperature of from about 60 to about 150 K to trap excitation in said vibrational levels and effect population inversions therebetween; and means for stimulating and extracting a laser beam from said excited lasing medium.

* * * * *